United States Patent
Li et al.

(10) Patent No.: US 12,470,434 B2
(45) Date of Patent: Nov. 11, 2025

(54) COMMUNICATIONS USING A NEURAL NETWORK BASED AT LEAST IN PART ON AN INDICATED INPUT SIZE AND/OR INPUT STRUCTURE

(71) Applicant: QUALCOMM Incorporated, San Diego, CA (US)

(72) Inventors: Qiaoyu Li, Beijing (CN); Yu Zhang, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 14 days.

(21) Appl. No.: 18/248,350

(22) PCT Filed: Dec. 9, 2020

(86) PCT No.: PCT/CN2020/134827
§ 371 (c)(1),
(2) Date: Apr. 7, 2023

(87) PCT Pub. No.: WO2022/120625
PCT Pub. Date: Jun. 16, 2022

(65) Prior Publication Data
US 2023/0388159 A1 Nov. 30, 2023

(51) Int. Cl.
*H04L 25/02* (2006.01)
*H04W 72/0457* (2023.01)
*H04W 72/1268* (2023.01)

(52) U.S. Cl.
CPC ..... *H04L 25/0254* (2013.01); *H04W 72/0457* (2023.01); *H04W 72/1268* (2013.01)

(58) Field of Classification Search
CPC .. G06N 3/02; G06N 3/04; G06N 3/08; G06N 20/00; H04B 7/06; H04B 7/0456;
(Continued)

(56) References Cited

U.S. PATENT DOCUMENTS

| 8,358,669 B2 | 1/2013 | Meylan et al. |
| 2014/0269374 A1* | 9/2014 | Abdelmonem ....... H04L 5/0073 370/252 |

(Continued)

FOREIGN PATENT DOCUMENTS

| KR | 20200046487 A | 5/2020 |
| WO | 2008137598 A1 | 11/2008 |

(Continued)

OTHER PUBLICATIONS

International Search Report and Written Opinion—PCT/CN2020/134827—ISA/EPO—Sep. 8, 2021.
(Continued)

*Primary Examiner* — Shawkat M Ali
(74) *Attorney, Agent, or Firm* — Harrity & Harrity, LLP

(57) ABSTRACT

Various aspects of the present disclosure generally relate to wireless communication. In some aspects, a user equipment (UE) may receive an indication of one or more of an input size or an input structure for a transmitting-side neural network, wherein the input structure indicates one or more of non-zero values or locations for the non-zero values within an input, having the input size, to the transmitting-side neural network. The UE may communicate with a base station based at least in part on the indication of the one or more of the input size or the input structure of the transmitting-side neural network. Numerous other aspects are provided.

30 Claims, 10 Drawing Sheets

(58) Field of Classification Search
CPC . H04L 5/00; H04L 12/18; H04L 12/26; H04L 25/02; H04L 25/03; H04L 25/0254; H04L 29/06; H04W 8/24; H04W 8/245; H04W 24/02; H04W 52/54; H04W 72/00; H04W 72/12; H04W 72/232; H04W 72/0457; H04W 72/1268
USPC ............... 375/219, 260, 262, 267, 295, 316
See application file for complete search history.

(56) References Cited

U.S. PATENT DOCUMENTS

| | | | |
|---|---|---|---|
| 2019/0191425 A1 | 6/2019 | Zhu et al. | |
| 2020/0367051 A1 | 11/2020 | Wang et al. | |
| 2023/0004864 A1* | 1/2023 | Wang | G06N 20/00 |
| 2023/0014613 A1* | 1/2023 | Je | H04W 36/0064 |
| 2023/0118031 A1* | 4/2023 | Cai | H04L 1/0026 |
| | | | 706/25 |
| 2023/0136416 A1* | 5/2023 | Liang | G06F 11/3495 |
| | | | 706/15 |
| 2023/0299885 A1* | 9/2023 | Wang | G06N 3/045 |
| | | | 370/328 |

FOREIGN PATENT DOCUMENTS

| | | |
|---|---|---|
| WO | 2018149898 A2 | 8/2018 |
| WO | 2019080987 A1 | 5/2019 |
| WO | 2019172813 A1 | 9/2019 |

OTHER PUBLICATIONS

Samsung: "Model Transfer Split Computation Decision Factors," 3GPP TSG-SA WG1 Meeting #91e, S1-203225, Electronic Meeting Aug. 24-28, 2020, (Aug. 28, 2020), the whole document, 3 pages.
Chen X., et al., "Data-Rate Driven Transmission Strategies for Deep Learning-Based Communication Systems", IEEE Transactions on Communications, vol. 68, No. 4, Apr. 2020, pp. 2129-2142, Jan. 21, 2020, p. 2-p. 4, figure 2, table II.
Supplementary European Search Report—EP20964569—Search Authority—The Hague—Sep. 18, 2024.
Chen X., et al., "Data-Rate Driven Transmission Strategies for Deep Learning-Based Communication Systems", IEEE Transactions on Communications, vol. 68, No. 4, Apr. 2020, pp. 2129-2134, pp. 2129-2142, Jan. 21, 2020, Figure 1.

* cited by examiner

COMMUNICATIONS USING A NEURAL NETWORK BASED AT LEAST IN PART ON AN INDICATED INPUT SIZE AND/OR INPUT STRUCTURE

CROSS-REFERENCE TO RELATED APPLICATION

This application is a 371 national stage of Patent Cooperation Treaty (PCT) Application No. PCT/CN2020/134827 filed on Dec. 9, 2020, entitled "COMMUNICATIONS USING A NEURAL NETWORK BASED AT LEAST IN PART ON AN INDICATED INPUT SIZE AND/OR INPUT STRUCTURE," which is hereby expressly incorporated by reference herein.

FIELD OF THE DISCLOSURE

Aspects of the present disclosure generally relate to wireless communication and to techniques and apparatuses for communications using a neural network based at least in part on an indicated input size and/or input structure.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving an indication of one or more of an input size or an input structure for a transmitting-side neural network, wherein the input structure indicates one or more of non-zero values or locations for the non-zero values within an input, having the input size, to the transmitting-side neural network; and communicating with a base station based at least in part on the indication of the one or more of the input size or the input structure of the transmitting-side neural network.

In some aspects, a UE for wireless communication includes a memory; and one or more processors operatively coupled to the memory, the memory and the one or more processors configured to: receive an indication of one or more of an input size or an input structure for a transmitting-side neural network, wherein the input structure indicates one or more of non-zero values or locations for the non-zero values within an input, having the input size, to the transmitting-side neural network; and communicate with a base station based at least in part on the indication of the one or more of the input size or the input structure of the transmitting-side neural network.

In some aspects, a method of wireless communication performed by a base station includes transmitting an indication of one or more of an input size or an input structure for a transmitting-side neural network, wherein the input structure indicates one or more of non-zero values or locations for the non-zero values within an input, having the input size, to the transmitting-side neural network; and communicating with a UE based at least in part on the indication of the one or more of the input size or the input structure of the transmitting-side neural network.

In some aspects, a base station for wireless communication includes a memory; and one or more processors operatively coupled to the memory, the memory and the one or more processors configured to: transmit an indication of one or more of an input size or an input structure for a transmitting-side neural network, wherein the input structure indicates one or more of non-zero values or locations for the non-zero values within an input, having the input size, to the transmitting-side neural network; and communicate with a UE based at least in part on the indication of the one or more of the input size or the input structure of the transmitting-side neural network.

In some aspects, a non-transitory computer-readable medium storing a set of instructions for wireless communication includes one or more instructions that, when executed by one or more processors of a UE, cause the UE to: receive an indication of one or more of an input size or an input structure for a transmitting-side neural network, wherein the input structure indicates one or more of non-zero values or locations for the non-zero values within an input, having the input size, to the transmitting-side neural network; and communicate with a base station based at least in part on the indication of the one or more of the input size or the input structure of the transmitting-side neural network.

In some aspects, a non-transitory computer-readable medium storing a set of instructions for wireless communication includes one or more instructions that, when executed by one or more processors of a base station, cause the base station to: transmit an indication of one or more of an input size or an input structure for a transmitting-side neural network, wherein the input structure indicates one or more of non-zero values or locations for the non-zero values within an input, having the input size, to the transmitting-side neural network; and communicate with a UE based at least in part on the indication of the one or more of the input size or the input structure of the transmitting-side neural network.

In some aspects, an apparatus for wireless communication includes means for receiving an indication of one or more of an input size or an input structure for a transmitting-side neural network, wherein the input structure indicates one or more of non-zero values or locations for the non-zero values within an input, having the input size, to the transmitting-side neural network; and means for communicating with a base station based at least in part on the indication of the one or more of the input size or the input structure of the transmitting-side neural network.

In some aspects, an apparatus for wireless communication includes means for transmitting an indication of one or more of an input size or an input structure for a transmitting-side neural network, wherein the input structure indicates one or more of non-zero values or locations for the non-zero values within an input, having the input size, to the transmitting-side neural network; and means for communicating with a UE based at least in part on the indication of the one or more of the input size or the input structure of the transmitting-side neural network.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
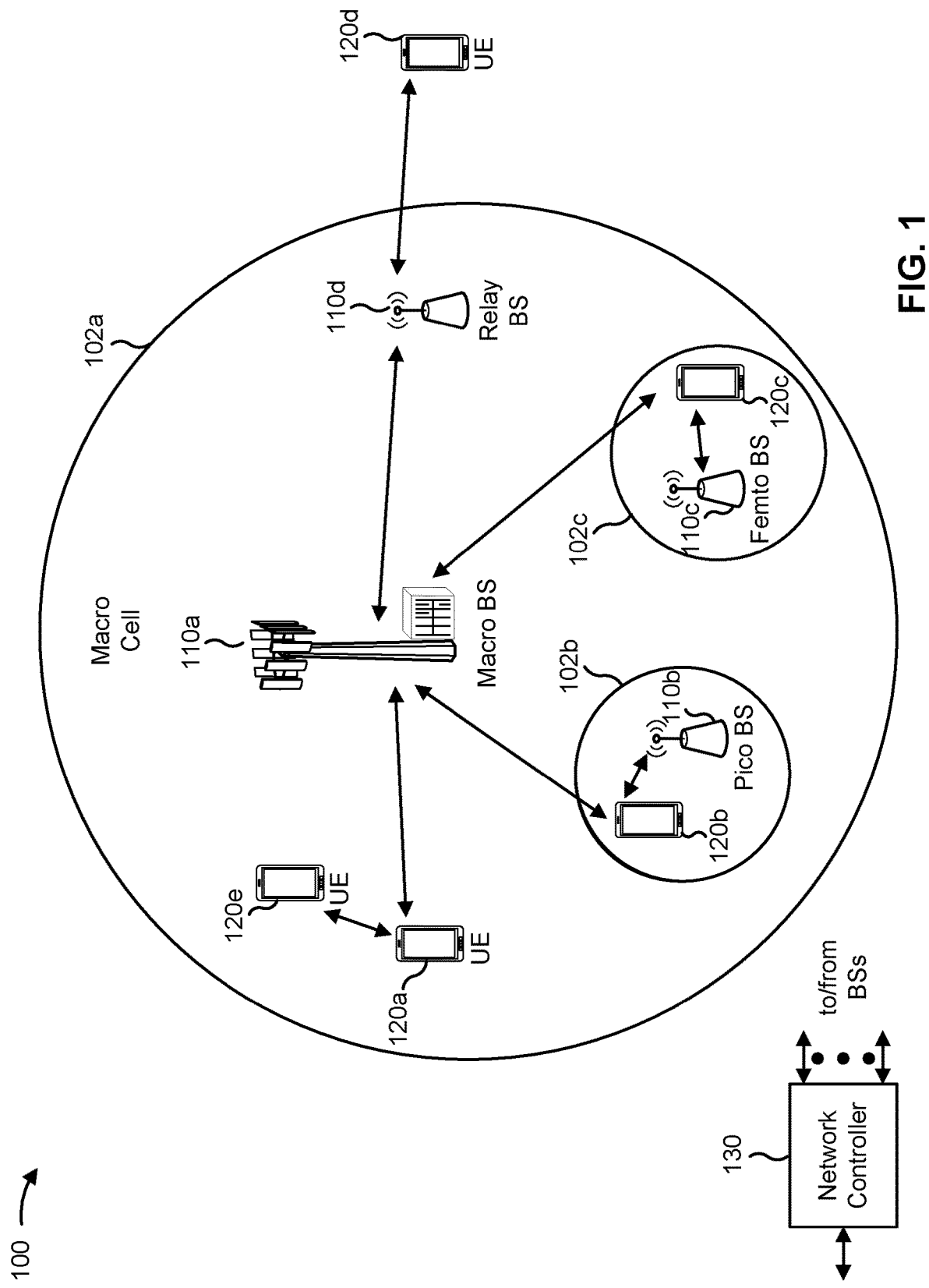
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
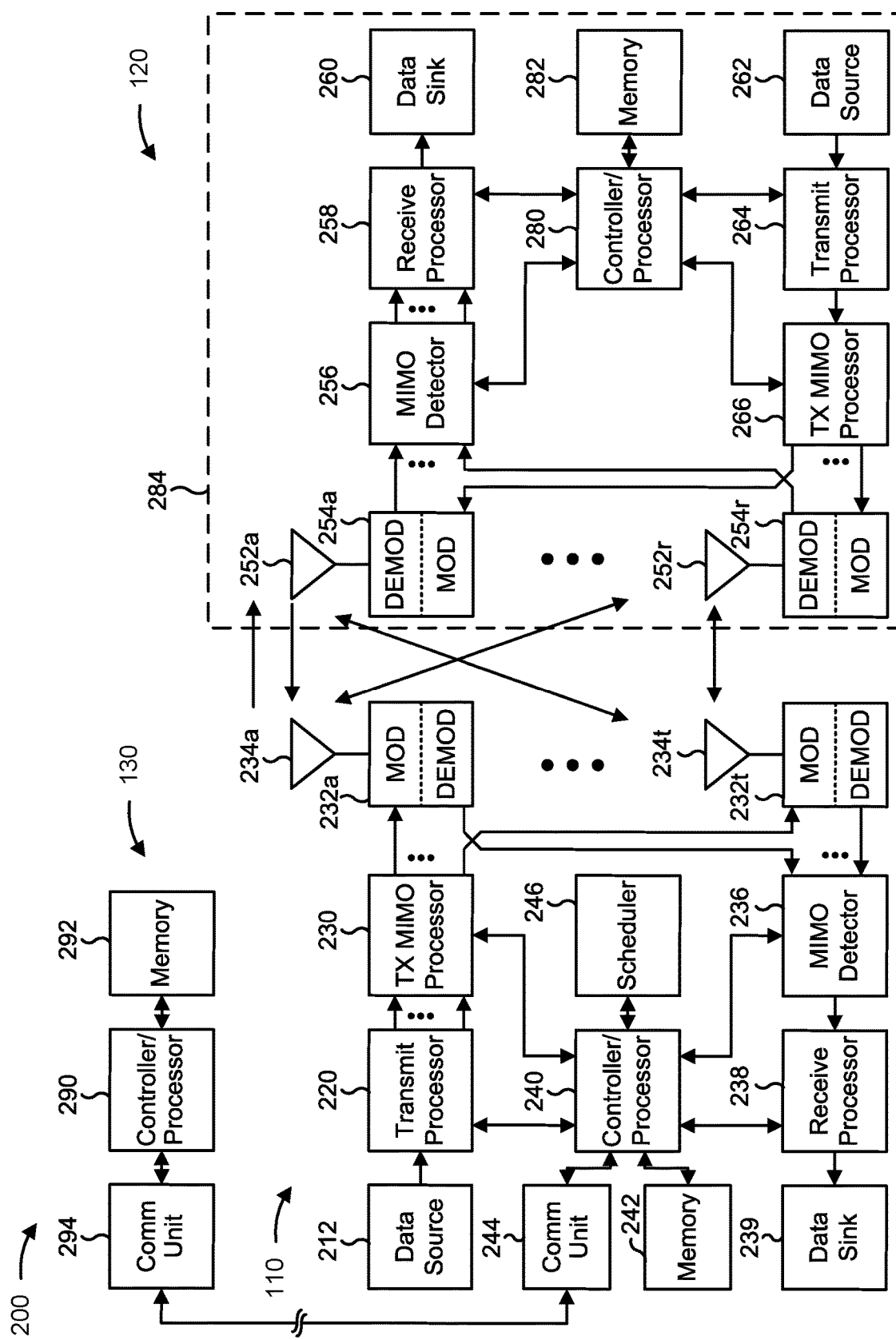
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4-8.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4-8.

Controller/processor 240 of base station 110, controller/processor 280 of UE 120, and/or any other component(s) of FIG. 2 may perform one or more techniques associated with communications using a neural network based at least in part on an indicated input size and/or input structure, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, the UE includes means for receiving an indication of one or more of an input size or an input structure for a transmitting-side neural network, wherein the input structure indicates one or more of non-zero values or locations for the non-zero values within an input, having the input size, to the transmitting-side neural network; or means for communicating with a base station based at least in part on the indication of the one or more of the input size or the input structure of the transmitting-side neural network. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for receiving the indication within a scheduling grant.

In some aspects, the UE includes means for receiving a definition of one or more parameters of the input size or the input structure.

In some aspects, the UE includes means for determining an uplink control channel format configuration based at least in part on the indication of the indication of the one or more of the input size or the input structure.

In some aspects, the UE includes means for receiving the indication associated with an uplink control channel resource within a scheduling grant for a downlink shared channel transmission.

In some aspects, the UE includes means for receiving, from the base station via a downlink control channel, a transmission generated by the base station based at least in part on the transmitting-side neural network.

In some aspects, the base station includes means for transmitting an indication of one or more of an input size or an input structure for a transmitting-side neural network, wherein the input structure indicates one or more of non-zero values or locations for the non-zero values within an input, having the input size, to the transmitting-side neural network; or means for communicating with a UE based at least in part on the indication of the one or more of the input size or the input structure of the transmitting-side neural network. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station includes means for transmitting the indication within a scheduling grant, or means for transmitting the indication within an uplink control channel format configuration.

In some aspects, the base station includes means for transmit the indication within a scheduling grant, or means for transmit the indication within an uplink control channel format configuration.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
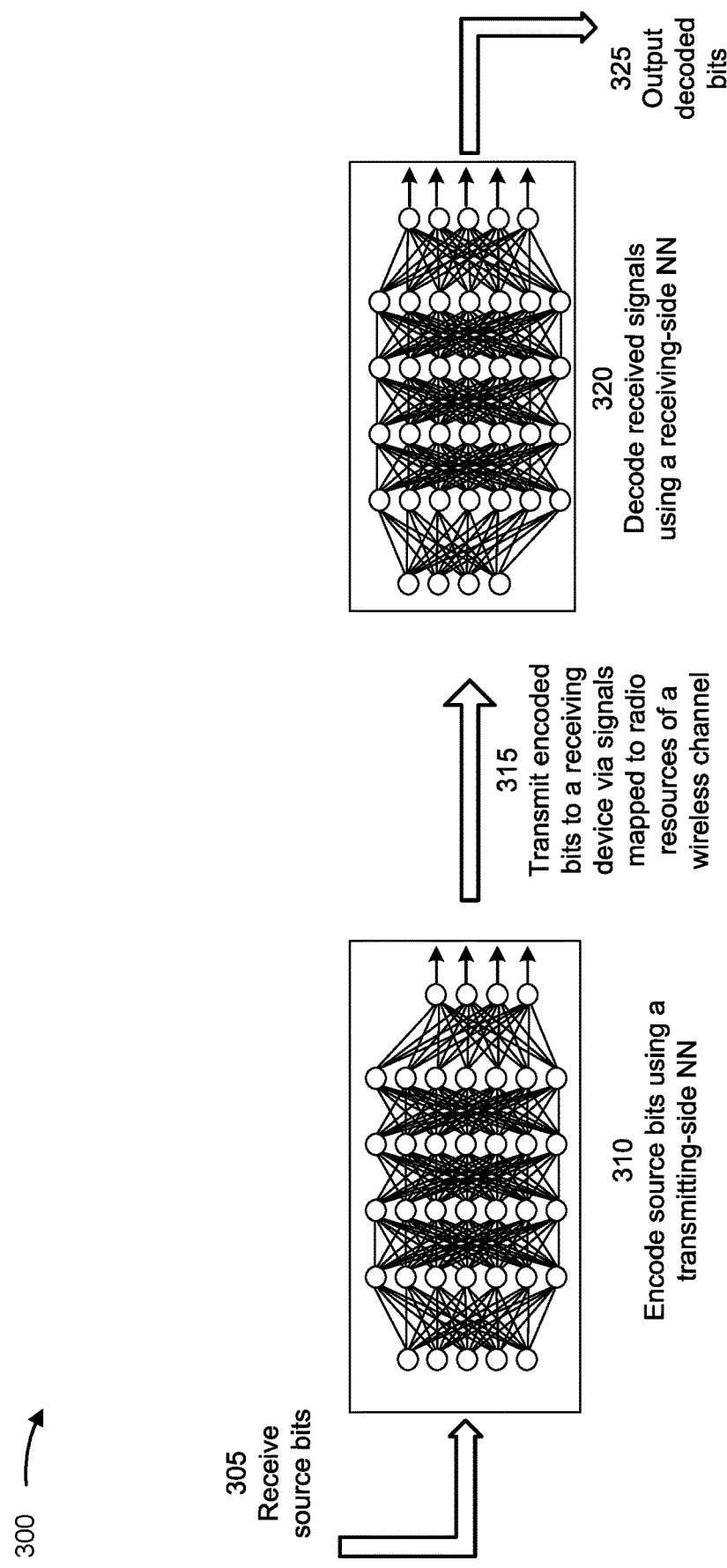
FIG. 3 is a diagram illustrating an example of a neural network-based communication, in accordance with various aspects of the present disclosure.

FIG. 3 is a diagram illustrating an example 300 of a neural network-based communication, in accordance with various aspects of the present disclosure. A transmitting-side neural network may be stored, executed, operated, and/or maintained on a transmitting device (e.g., a UE or a base station). A receiving-side neural network may be stored, executed, operated, and/or maintained on a receiving device (e.g., a UE or a base station). The receiving-side neural network may be associated with the transmitting-side neural network. For example the receiving-side neural network may be configured to decode bits (e.g., bits carried on signaling) that are encoded by the transmitting-side neural network (e.g., using a neural network with mirrored operations from the transmitting-side neural network).

As shown in FIG. 3, and by reference number 305, a transmitting-side neural network may receive source bits for encoding. The source bits may be associated with control information and/or data for transmitting to a receiving device.

As shown by reference number 310, a transmitting device may encode source bits using the transmitting-side neural network. For example, the transmitting device may provide the source bits as inputs to the transmitting-side neural network and may obtain output encoded bits as outputs from the transmitting-side neural network. The encoded bits may have a reduced payload when compared to a payload of the source bits.

The transmitting-side neural network may perform (e.g., the transmitting device may use the transmitting-side neural network to perform) one or more operations on the source bits, such as one or more convolution operations (e.g., by a convolution layer), a flattening operation (e.g., by a flattening layer), and/or a fully connected operation (e.g., by a fully connected layer), among other examples.

The transmitting device may map the encoded bits to radio resources (e.g., resource elements (REs), RE segments, and/or physical resource blocks (PRBs), among other examples).

As shown by reference number 315, the transmitting device may transmit the encoded bits to the receiving device via signals mapped to radio resources of a wireless channel. For example, the transmitting device may map the encoded bits to carrier wave signaling for transmission during time-frequency resources allocated (e.g., by the transmitting device or the receiving device, among other examples) for transmission of the encoded bits. The transmitting device may provide the mapped encoded bits to one or more antennas for transmission to the receiving device.

As shown by reference number 320, the receiving device may decode received signals using a receiving-side neural network. For example, one or more antennas of the receiving device may receive the signals that carry the encoded bits. The receiving device may perform one or more operations to extract the encoded bits from the signaling. The one or more operations may mirror the one or more operations performed by the transmitting-side neural network to encode the encoded bits.

The receiving device may provide the encoded bits to the receiving-side neural network for decoding. The receiving-side neural network may perform one or more operations on the encoded bits, such as one or more convolution operations (e.g., by a convolution layer), a reshaping operation (e.g., by a reshaping layer), and/or a fully connected operation (e.g., by a fully connected layer), among other examples.

As shown by reference number 325, the receiving device may output decoded bits from the receiving-side neural network. The decoded bits may include some or all of the bits of the source bits.

As indicated above, FIG. 3 is provided as an example. Other examples may differ from what is described with regard to FIG. 3.

In some wireless networks, using a transmitting-side neural network and an associated receiving-side neural network to communicate between a transmitting device and a receiving device may provide efficiencies in wireless communication. For example, a transmitting device may replace encoding, modulating, and/or precoding with operations of a transmitting-side neural network. Additionally, or alternatively, a receiving device may replace synchronizing, channel estimating, detecting, decoding, and/or demodulating with operations of a transmitting-side neural network. In some wireless networks, neural networks may replace one or more transmitting and/or receiving modules used to perform encoding, modulating, precoding, synchronizing, channel estimating, detecting, decoding, and/or demodulating.

The transmitting device and/or the receiving device may train the transmitting-side neural network and/or the receiving-side neural network using offline training. The transmitting device and/or the receiving device may refine (e.g., update) the transmitting-side neural network and/or the receiving-side neural network using online refinement (e.g., receiving updates to the neural networks such as weights of layers of the neural networks, among other examples).

The transmitting-side neural network and/or the transmitting device using the transmitting-side neural network may be defined as an autoencoder. Similarly, the receiving-side neural network and/or the receiving device using the receiving-side neural network may be defined as an autoencoder.

In some wireless networks, neural network input for autoencoder-based transmissions includes one or more one-hot vectors. A one-hot vector includes a vector of entries with only one entry having a value of 1 and all other entries having values of 0. A length of a one-hot vector may be M (which may be a power of 2), which may carry M candidate messages (e.g., each candidate message associated with a different position of the entry having a value of 1) and/or $\log_2 M$ bits. In these wireless networks, an input size grows linearly with the value of M, and an increased input size increases a size and/or complexity of the transmitting-side neural network and/or an associated receiving-side neural network. In other words, to increase a number of candidate messages, the transmitting device may consume additional computing resources to use the transmitting-side neural network and/or the receiving device may consume additional computing resources to use the receiving-side neural network.

In some wireless networks, neural network input for autoencoder-based transmissions includes M-choose-m vectors. An M-choose-m vector may include a vector having a size M (e.g., with M entries) with m entries having a non-zero value. The non-zero value may be the same for all m entries. The m entries may have values normalized to represent probabilities (e.g., a length of the vector M may be 1). For an M-choose-m vector, a number of candidate messages may be $$2^{\left\lfloor \log_2 \binom{M}{m} \right\rfloor}$$

candidate messages, and/or $$\left\lfloor \log_2 \binom{M}{m} \right\rfloor$$

bits. An M-choose-m vector may provide an output with a reduced complexity when compared to a one-hot vector that provides the same output. For example, an M-choose-m vector with M=8 and m=4, a throughput is the same as a length-64 one-hot vector input. In other words, the example M-choose-m vector has an input size of ⅛ of an equivalent one-hot vector to provide 64 candidate messages.

Although neural network-based communications with a relatively high complexity (e.g. with larger size (M) and structure (size of m)) provide a relatively high throughput, complexity of a transmitting-side neural network may affect a complexity of detection at a receiving-side neural network. An ability of a receiver device to decode bits encoded with a transmitting-side neural network may depend on channel conditions, such as a signal-to-interference-plus-noise ratio (SINR), an RSRP, an RSSI, an RSRQ, and/or a CQI, among other examples. Based at least in part on the transmitting-side neural network using a complexity that is not supported by the channel conditions, the receiving device may fail to decode bits that are encoded using the transmitting-side neural network. Failure to decode bits that are encoded using the transmitting-side neural network may consume computing, network, communication, and/or power resources to detect and correct (e.g., using signaling and/or retransmissions between the transmitting device and the receiving device).

In some aspects described herein, a UE (e.g., a UE 120) may receive an indication of an input size and/or an input structure for a transmitting-side neural network. The input size may indicate a number of values M in an input vector of an M-choose-m vector and the input structure may indicate a number of non-zero values m and/or locations for the non-zero values within the input vector. The UE may communicate with a base station based at least in part on the indication of the input size and/or the input structure of the transmitting-side neural network. In some aspects, the UE may be a transmitting device that uses the transmitting-side neural network. In some aspects, the base station may be the transmitting device that uses the transmitting-side neural network.

Based at least in part on the UE communicating with the base station based at least in part on the indication of the input size and/or the input structure, the base station may indicate one or more parameters affecting a complexity of communications using the transmitting-side neural network. In this way, the base station may adjust a complexity of the transmitting-side neural network and/or the receiving-side neural network dynamically and/or semi-statically. This may allow the base station to change complexity based at least in part on one or more parameters, such as channel conditions, that may affect a likelihood of reception by a receiving device. In this way, the base station and/or the UE may conserve computing, network, communication, and/or power resources to detect and correct failures to receive and/or decode bits transmitted using the transmitting-side neural network.

In some aspects, the base station may transmit an uplink grant for the UE to transmit a physical uplink shared channel (PUSCH) communication and/or a physical uplink control channel (PUCCH) communication. In some aspects, the base station may transmit a downlink grant for the UE to receive a physical downlink shared channel (PDSCH) communication and/or a physical downlink control channel (PDCCH) communication. The uplink grant or the downlink grant may configure and/or indicate a configuration for the input size and/or the input structure to be used for transmission of a scheduled communication (e.g., by the UE or by the base station).

In some aspects, the input size and/or the input structure may be partially defined. In these aspects, the uplink grant or the downlink grant may configure and/or indicate values of the input size and/or the input structure that are not defined. For example, a value of M may be defined in a communication standard and the uplink grant or the downlink grant may configure and/or indicate a value for m and/or locations for the non-zero values within the input vector.

In some aspects where the base station is configured to use the transmitting-side neural network having the indicated input size and/or input structure, the indication may identify (e.g., may be used by the UE to identify) an associated receiving-side neural network to use for receiving (e.g., detecting) encoded bits transmitted using the transmitting-side neural network.

In some aspects, a first transmitting-side neural network may be used to encode a first RE segment of a PRB to be transmitted, a second transmitting-side neural network may be used to encode a second RE segment of the PRB, and/or a third transmitting-side neural network may be used to encode a third RE segment of the PRB, among other examples. Each RE segment may include a number of REs of the PRB. A source bit sequence may be segmented into multiple sub-sequences, with each of the sub-sequences associated with different RE segments.

In some aspects, each RE segment may include a common number of REs, a common number of OFDM symbols, and/or a common input size and input structure for a transmitting-side neural network. In some aspects, one or more RE segments may have a different number of REs, a different number of OFDM symbols, and/or a different input size and/or input structure for a transmitting-side neural network used to encode bits of the one or more RE segments. For example, a first segment may be control signaling that is piggybacked on one or more segments used to carry data signaling.

In some aspects, an uplink grant or downlink grant may implicitly or explicitly configure and/or indicate input sizes and/or input structures associated with different RE segments. For example, the uplink grant or downlink grant may implicitly configure and/or indicate the input sizes and/or input structures based at least in part on indicated RE segmentations that are associated with the input sizes and/or input structures (e.g., based at least in part on an indicated definition, a communication standard, and/or radio resource control (RRC) configuration signaling, among other examples).

In some aspects, one or more of the RE segments may be associated with different cyclic redundancy check and/or different hybrid automatic repeat request (HARQ) feedback. In this way, a receiving device may separately indicate HARQ feedback for segments having different input sizes and/or input structures. This may provide information for updating an input size and/or input structure for a subsequent communication.

In some aspects, the UE may be configured to use the transmitting-side neural network having an indicated input size and/or input structure for transmitting uplink control information (e.g., a PUCCH communication). In some aspects, a PUCCH format may be defined based at least in part on the indicated input size and/or input structure. In some aspects, different PUCCH resources within a PUCCH resource set may be associated with different input sizes and/or input structures. In some aspects, all PUCCH resources within a PUCCH resource set may be associated with a same set of input sizes and/or input structures. In some aspects, the base station may indicate the input size and/or input structure for one or more PUCCH resources for HARQ feedback (e.g., HARQ acknowledgment (HARQ-ACK)) feedback associated with a PDSCH communication within downlink control information (DCI) and/or RRC signaling that schedules the PDSCH communication.

In some aspects, the UE may receive an indication that the base station is to transmit a PDCCH communication using a transmitting-side neural network having the indicated input size and/or the input structure. In some aspects, a first input size and/or input structure may apply to a first RE group (REG) bundle and/or to a first control channel element. In some aspects, a second input size and/or input structure may apply to a second REG bundle and/or to a second control channel element. In some aspects, all REG bundles and control channel elements may have a same input size and/or input structure.

In some aspects, different aggregation levels may be configured and/or predefined with different input sizes and/or input structures. In some aspects, different search spaces and/or different control resource sets may be configured and/or predefined with different input sizes and/or input structures. Different search spaces and/or different control resource sets with different input sizes and/or input structures may have different priorities for the UE to monitor when the PDCCH is overbooked (e.g., UE is not configured or capable to monitor all search spaces and/or control resource sets), and/or when the UE is configured in a power saving mode (e.g., a discontinuous reception (DRX) mode or sleep mode, among other examples). For example, a search space and/or a control resource set associated with an input size and/or input structure that includes a relatively high number of neurons (e.g., having a relatively high complexity) may have a relatively low priority when the UE is configured in a DRX mode and/or if a number of attempts for blind decoding or channel estimation threshold is less than a determined number of PDCCH decodings (e.g., associated with a number of search spaces and/or control resource sets).

Figure 4:
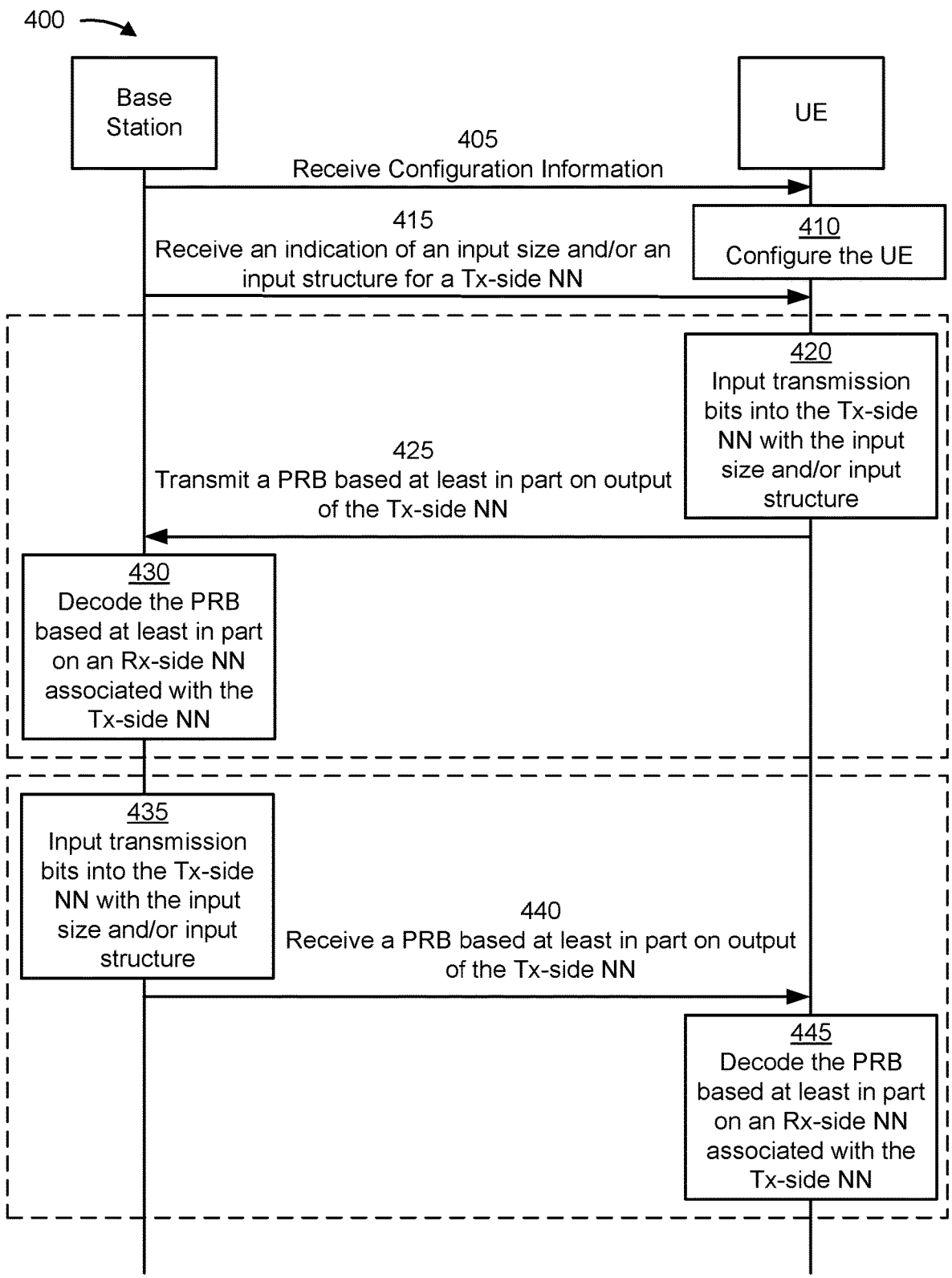
FIGS. 4-6 are diagrams illustrating examples associated with communications using a neural network based at least in part on an indicated input size and/or input structure, in accordance with various aspects of the present disclosure.

FIG. 4 is a diagram illustrating an example 400 associated with communications using a neural network based at least in part on an indicated input size and/or input structure, in accordance with various aspects of the present disclosure. As shown in FIG. 4, a UE (e.g., UE 120) may communicate with a base station (e.g., base station 110). The UE and the base station may be part of a wireless network (e.g., wireless network 100). In some aspects, the UE and the base station may be configured with one or more of a transmitting-side neural network or a receiving-side neural network. In some aspects, the UE is configured with a transmitting-side neural network for uplink communications and a receiving-side neural network for downlink communication. In some aspects, the base station is configured with a transmitting-side neural network for downlink communications and a receiving-side neural network for uplink communications.

As shown by reference number 405, the base station may transmit, and the UE may receive, configuration information. In some aspects, the UE may receive configuration information from another device (e.g., from another base station and/or another UE) and/or a communication standard, among other examples. In some aspects, the UE may receive the configuration information via one or more of RRC signaling, medium access control (MAC) control element (CE) signaling, or DCI signaling, and/or the UE may determine the configuration information from a communication standard, among other examples. In some aspects, the configuration information may include an indication of one or more configuration parameters (e.g., already known to the UE) for selection by the UE, explicit configuration information for the UE to use to configure the UE, and/or the like.

In some aspects, the configuration information may indicate that the UE is to use a transmitting-side neural network for uplink communications to the base station. In some aspects, the configuration information may indicate that the UE is to use a receiving-side neural network for receiving downlink communication from the base station. In some aspects, the configuration information may indicate that the UE is to use a default input size and/or input structure for the transmitting-side neural network and/or for the receiving-side neural network until or unless the base station transmits an indication of an input size and/or an input structure for one or more communications (e.g., an uplink communication and/or a downlink communication).

As shown by reference number 410, the UE may configure the UE for communicating with the base station. In some aspects, the UE may configure the UE based at least in part on the configuration information. In some aspects, the UE may be configured to perform one or more operations described herein.

As shown by reference number 415, the UE may receive, and the base station may transmit, an indication of an input size and/or an input structure for a transmit-side (Tx-side) neural network (NN). In some aspects, the UE may receive an indication of one or more of an input size M or an input structure for a transmitting-side neural network, wherein the input structure indicates one or more of non-zero values m or locations for the non-zero values within an input, having the input size, to the transmitting-side neural network. In some aspects, the UE may receive the indication within a scheduling grant (e.g., a grant for PUSCH).

In some aspects, the indication may include a definition of one or more parameters of the input size and/or the input structure. For example, the indication may define a number of one or more non-zero values and/or location for the non-zero values within an input.

In some implementations, the indication may include an indication of one or more receiving-side neural networks associated with the transmitting-side neural network. For example, if the indication includes an indication that the base station is to use the transmitting-side neural network having the input size and/or input structure, the indication may include an implicit and/or explicit indication of one or more receiving-side neural networks to use to decode a communication transmitted by the base station. In some implementations, an indicated receiving-side neural network may have a corresponding (e.g., mirrored) input size and/or input structure from the transmitting-side neural network.

In some implementations, the input size and/or the input structure are associated with one or more RE segments of a PRB. In some aspects, the input size and/or the input structure are associated with all RE segments of the PRB. In some aspects, an additional input size and/or an additional input structure are associated with one or more additional RE segments of the PRB. In some aspects, the indication may include an indication of the additional input size and/or an additional input structure for the one or more additional RE segments of the PRB.

As shown by reference number 420, the UE may input transmission bits into the transmitting-side neural network with the input size and/or the input structure. In some aspects, the UE may input all transmission bits into a single transmitting-side neural network having a common input size and/or input structure. In some aspects, the UE may input different RE segments of the PRB into a different transmitting-side neural networks and/or into a common transmitting-side neural network with different input sizes and/or input structures.

As shown by reference number 425, the UE may transmit, and the base station may receive, a PRB based at least in part on output of the transmitting-side neural network. In some aspects, the UE may transmit a PRB, after applying the transmitting-side neural network, with normalized power over one or more RE segments of the PRB.

As shown by reference number 430, the base station may decode the PRB based at least in part on a receiving-side (Rx-side) neural network associated with the transmitting-side neural network used by the UE to transmit the PRB. For example, the base station may decode the PRB based at least in part on inputting, to the receiving-side neural network, encoded bits extracted from signaling carrying the PRB. In some aspects, the base station may decode the PRB based at least in part on the receiving-side neural network outputting decoded bits.

Operations shown by reference numbers 420-430 may be associated with an uplink communication where the UE uses the transmitting-side neural network. For example, the operations may be associated with the UE transmitting data using a PUSCH.

As shown by reference number 435, the base station may input transmission bits into the transmitting-side neural network with the input size and/or the input structure. In some aspects, the base station may input all transmission bits into a single transmitting-side neural network having a common input size and/or input structure. In some aspects, the base station may input different RE segments of the PRB into a different transmitting-side neural networks and/or into a common transmitting-side neural network with different input sizes and/or input structures.

As shown by reference number 440, the base station may transmit, and the UE may receive, a PRB based at least in part on output of the transmitting-side neural network. In some aspects, the base station may transmit a PRB, after applying the transmitting-side neural network, with normalized power over one or more RE segments of the PRB.

As shown by reference number 445, the UE may decode the PRB based at least in part on a receiving-side neural network associated with the transmitting-side neural network used by the base station to transmit the PRB. For example, the UE may decode the PRB based at least in part on inputting, to the receiving-side neural network, encoded bits extracted from signaling carrying the PRB. In some aspects, the UE may decode the PRB based at least in part on the receiving-side neural network outputting decoded bits.

Operations shown by reference numbers 435-445 may be associated with a downlink communication where the UE uses the receiving-side neural network. For example, the operations may be associated with the UE receiving data using a PDSCH.

Based at least in part on the UE communicating with the base station based at least in part on the indication of the input size and/or the input structure, the base station may indicate one or more parameters affecting a complexity of communications using the transmitting-side neural network. In this way, the base station may adjust a complexity of the transmitting-side neural network and/or the receiving-side neural network dynamically and/or semi-statically. This may allow the base station to change complexity based at least in part on one or more parameters, such as channel conditions, that may affect a likelihood of reception by a receiving device. In this way, the base station and/or the UE may conserve computing, network, communication, and/or power resources to detect and correct failures to receive and/or decode bits transmitted using the transmitting-side neural network.

As indicated above, FIG. 4 is provided as an example. Other examples may differ from what is described with regard to FIG. 4.

Figure 5:
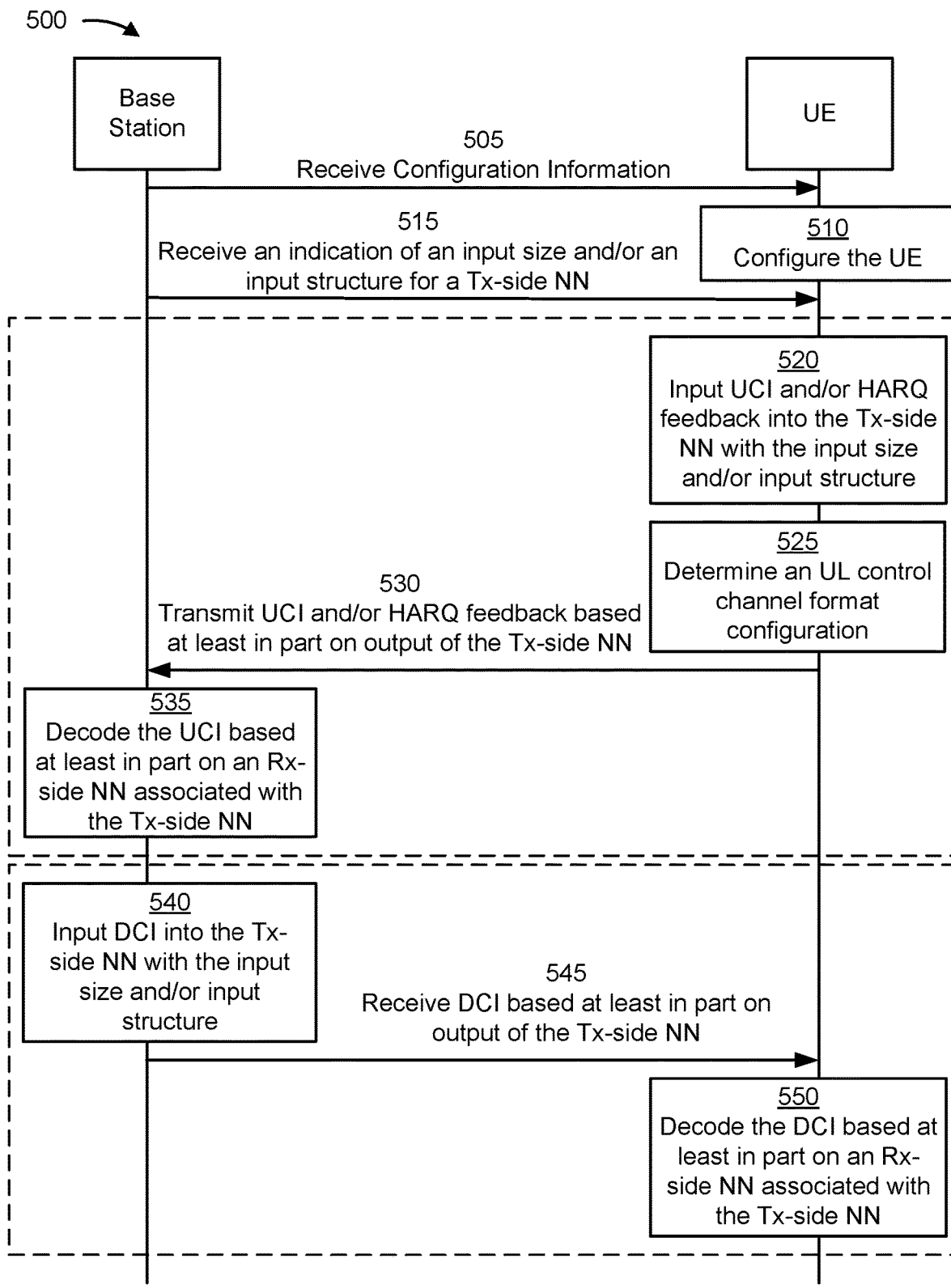

FIG. 5 is a diagram illustrating an example 500 associated with communications using a neural network based at least in part on an indicated input size and/or input structure, in accordance with various aspects of the present disclosure. As shown in FIG. 5, a UE (e.g., UE 120) may communicate with a base station (e.g., base station 110). The UE and the base station may be part of a wireless network (e.g., wireless network 100). In some aspects, the UE and the base station may be configured with one or more of a transmitting-side neural network or a receiving-side neural network. In some aspects, the UE is configured with a transmitting-side neural network for uplink communications and a receiving-side neural network for downlink communication. In some aspects, the base station is configured with a transmitting-side neural network for downlink communications and a receiving-side neural network for uplink communications.

As shown by reference number 505, the base station may transmit, and the UE may receive, configuration information. In some aspects, the UE may receive configuration information from another device (e.g., from another base station and/or another UE) and/or a communication standard, among other examples. In some aspects, the UE may receive the configuration information via one or more of RRC signaling, MAC-CE signaling, or DCI signaling, and/or the UE may determine the configuration information from a communication standard, among other examples. In some aspects, the configuration information may include an indication of one or more configuration parameters (e.g., already known to the UE) for selection by the UE, explicit configuration information for the UE to use to configure the UE, and/or the like.

In some aspects, the configuration information may indicate that the UE is to use a transmitting-side neural network for uplink communications to the base station. In some aspects, the configuration information may indicate that the UE is to use a receiving-side neural network for receiving downlink communication from the base station. In some aspects, the configuration information may indicate that the UE is to use a default input size and/or input structure for the transmitting-side neural network and/or for the receiving-side neural network until or unless the base station transmits an indication of an input size and/or an input structure for one or more communications (e.g., an uplink communication and/or a downlink communication).

As shown by reference number 510, the UE may configure the UE for communicating with the base station. In some aspects, the UE may configure the UE based at least in part on the configuration information. In some aspects, the UE may be configured to perform one or more operations described herein.

As shown by reference number 515, the UE may receive, and the base station may transmit, an indication of an input size and/or an input structure for a transmit-side (Tx-side) neural network (NN). In some aspects, the UE may receive an indication of one or more of an input size M or an input structure for a transmitting-side neural network, wherein the input structure indicates one or more of non-zero values m or locations for the non-zero values within an input, having the input size, to the transmitting-side neural network. In some aspects, the UE may receive the indication within a scheduling grant (e.g., a grant for a PUCCH, or a grant for PDSCH with an associated PUCCH).

In some aspects, the indication may include a definition of one or more parameters of the input size and/or the input structure. For example, the indication may define a number of one or more non-zero values and/or location for the non-zero values within an input.

In some implementations, the indication may include an indication of one or more receiving-side neural networks associated with the transmitting-side neural network. For example, if the indication includes an indication that the base station is to use the transmitting-side neural network having the input size and/or input structure, the indication may include an implicit and/or explicit indication of one or more receiving-side neural networks to use to decode a communication transmitted by the base station. In some implementations, an indicated receiving-side neural network may have a corresponding (e.g., mirrored) input size and/or input structure from the transmitting-side neural network.

In some aspects, a first uplink control channel (e.g., PUCCH) resource within a first uplink control channel resource set is associated with the input size and/or the input structure. In some aspects, a second uplink control channel resource within the first uplink control channel resource set is associated with an additional input size and/or an additional input structure.

In some aspects, the UE may receive the indication associated with an uplink control channel resource within a scheduling grant for a downlink shared channel (e.g., PDSCH) transmission. In these aspects, the UE may transmit HARQ feedback using the uplink control channel resource via the transmitting-side neural network using the input size and/or the input structure.

In some aspects, the input size and/or the input structure may be associated with one or more RE group bundles, one or more control channel elements, one or more aggregation levels, one or more search spaces, and/or one or more control resource sets, among other examples. In some aspects, different input sizes and/or input structures may be associated with different RE group bundles, control channel elements, aggregation levels, search spaces, and/or control resource sets, among other examples.

As shown by reference number 520, the UE may input uplink control information (UCI) bits and/or HARQ feedback bits into the transmitting-side neural network with the input size and/or the input structure. In some aspects, the UE may use a common transmitting-side neural network having a common input size and/or input structure for all UCI bits and/or HARQ feedback bits. In some aspects, the UE may use different transmitting-side neural networks and/or different input sizes and/or input structures for UCI bits and/or HARQ feedback bits to be transmitted via different uplink control channel resource sets.

As shown by reference number 525, the UE may determine an uplink control channel format configuration. In some aspects, the UE may determine the uplink control channel format configuration based at least in part on the indication of the input size and/or input structure. For example, the UE may be configured with an association (e.g., a mapping) between uplink control channel format configurations and indications of input size and/or input structure.

As shown by reference number 530, the UE may transmit, and the base station may receive, the UCI and/or HARQ feedback based at least in part on output of the transmitting-side neural network.

As shown by reference number 535, the base station may decode the UCI and/or HARQ feedback based at least in part on a receiving-side (Rx-side) neural network associated with the transmitting-side neural network used by the UE to transmit the PRB. For example, the base station may decode the PRB based at least in part on inputting, to the receiving-side neural network, encoded bits extracted from signaling carrying the UCI and/or HARQ feedback. In some aspects, the base station may decode the UCI and/or HARQ feedback based at least in part on the receiving-side neural network outputting decoded bits.

Operations shown by reference numbers 520-535 may be associated with an uplink communication where the UE uses the transmitting-side neural network. For example, the operations may be associated with the UE transmitting data using a PUCCH.

As shown by reference number 540, the base station may input DCI bits into the transmitting-side neural network with the input size and/or the input structure. In some aspects, the base station may use a common transmitting-side neural network having a common input size and/or input structure for all DCI bits. In some aspects, the base station may use different transmitting-side neural networks and/or different input sizes and/or input structures for DCI bits to be transmitted via different uplink control channel resource sets.

As shown by reference number 545, the base station may transmit, and the UE may receive, DCI based at least in part on output of the transmitting-side neural network. For example, the UE may receive the DCI generated by the base station based at least in part on the transmitting-side neural network. The input size and/or the input structure may be associated with one more RE group bundles, one or more control channel elements, one or more aggregation levels, one or more search spaces, and/or one or more control resource sets, among other examples. In some aspects, different input sizes and/or different input structures may be associated with different RE group bundles, different control channel elements, different aggregation levels, different search spaces, and/or different control resource sets, among other examples.

As shown by reference number 550, the UE may decode the DCI based at least in part on a receiving-side neural network associated with the transmitting-side neural network used by the base station to transmit the DCI. For example, the UE may decode the DCI based at least in part on inputting, to the receiving-side neural network, encoded bits extracted from signaling carrying the DCI. In some aspects, the UE may decode the DCI based at least in part on the receiving-side neural network outputting decoded bits.

In some aspects, the UE may be configured to prioritize monitoring of the first control resource set or the second control resource set based at least in part on the UE operating in a power saving mode, a number of blind decoding attempts satisfying a threshold, and/or a number of channel estimation attempts satisfying a threshold.

Operations shown by reference numbers 540-550 may be associated with a downlink communication where the UE uses the receiving-side neural network. For example, the operations may be associated with the UE receiving data using a PDCCH.

As indicated above, FIG. 5 is provided as an example. Other examples may differ from what is described with regard to FIG. 5.

Figure 6:
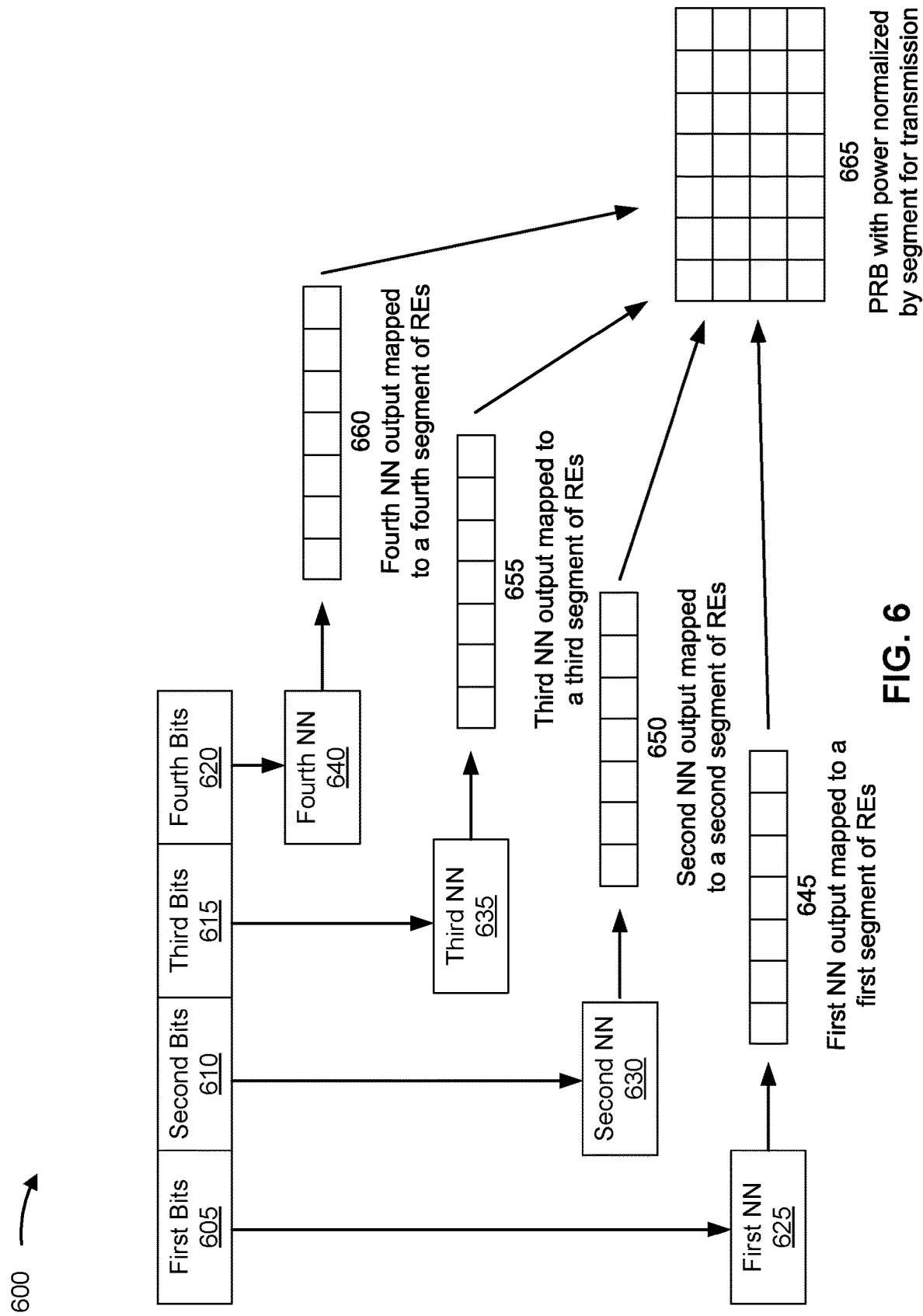

FIG. 6 is a diagram illustrating an example 600 associated with communications using a neural network based at least in part on an indicated input size and/or input structure, in accordance with various aspects of the present disclosure. As shown in FIG. 6, a transmitting device (e.g., UE 120 or base station 110, among other examples) may communicate with a receiving device (e.g., UE 120 or base station 110, among other examples). The transmitting device and the receiving device may be part of a wireless network (e.g., wireless network 100). In some aspects, the transmitting device may be configured with one or more transmitting-side neural networks.

As shown in FIG. 6, a bit sequence for transmission may include first bits 605, second bits 610, third bits 615, and/or fourth bits 620. As part of an encoding operation, the first bits 605 may be provided as input to a first neural network 625, the second bits 610 may be provided as input to a second neural network 630, the third bits 615 may be provided as input to a third neural network 635, and/or the fourth bits 620 may be provided as input to a fourth neural network 640. In some aspects, each of the neural networks may be distinct neural networks. In some aspects, each of the neural networks may be a same neural network. In some aspects, one or more of the neural networks may be a same neural network with different parameters, such as input size and/or input structure used for inputs.

As further shown in FIG. 6, the first neural network 625 may generate a first neural network output (e.g., encoded bits) mapped to a first segment of REs 645, the second neural network 630 may generate a second neural network output mapped to a second segment of REs 650, the third neural network 635 may generate a third neural network output mapped to a third segment of REs 655, and/or the fourth neural network 640 may generate a fourth neural network output mapped to a fourth segment of REs 660.

As further shown in FIG. 6, the first neural network output mapped to the first segment of REs 645, the second neural network output mapped to the second segment of REs 650, the third neural network output mapped to the third segment of REs 655, and/or the fourth neural network output mapped to the fourth segment of REs 660 may be normalize (e.g., with transmission power) to form a PRB with power normalized by segment 665. The transmitting the device may transmit the PRB with power normalized by segment 665 to the receiving device for decoding using one or more receiving-side neural networks associated with the first neural network 625, the second neural network 630, the third neural network 635, and/or the fourth neural network 640.

As indicated above, FIG. 6 is provided as an example. Other examples may differ from what is described with regard to FIG. 6.

Figure 7:
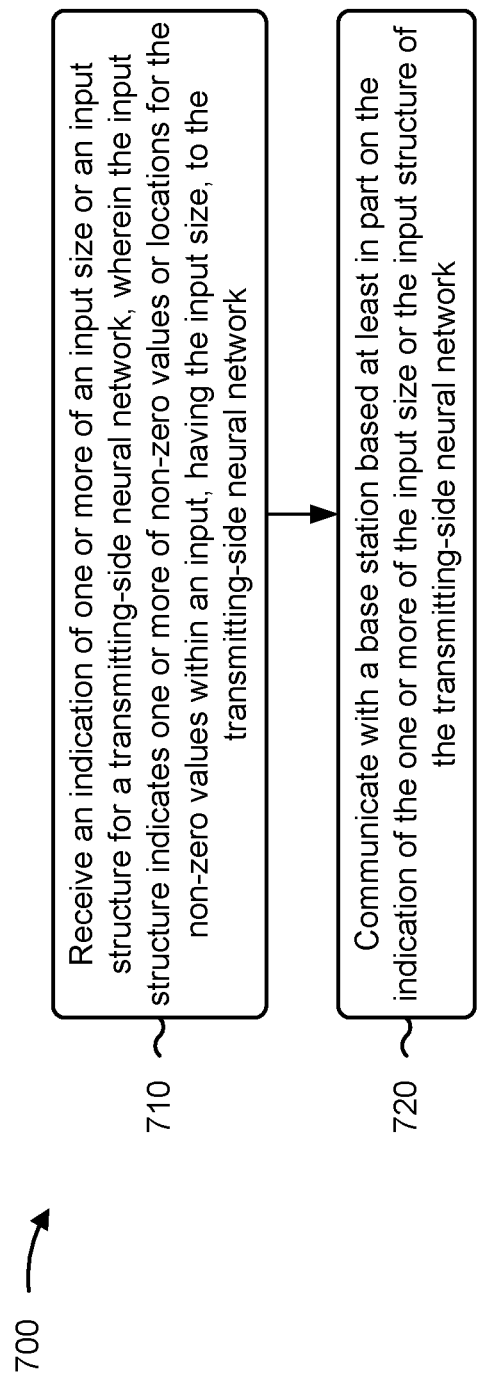
FIGS. 7 and 8 are diagrams illustrating example processes associated with communications using a neural network based at least in part on an indicated input size and/or input structure, in accordance with various aspects of the present disclosure.

FIG. 7 is a diagram illustrating an example process 700 performed, for example, by a UE, in accordance with various aspects of the present disclosure. Example process 700 is an example where the UE (e.g., UE 120) performs operations associated with communications using a neural network based at least in part on an indicated input size and/or input structure.

As shown in FIG. 7, in some aspects, process 700 may include receiving an indication of one or more of an input size or an input structure for a transmitting-side neural network, wherein the input structure indicates one or more of non-zero values or locations for the non-zero values within an input, having the input size, to the transmitting-side neural network (block 710). For example, the UE (e.g., using reception component 902, depicted in FIG. 9) may receive an indication of one or more of an input size or an input structure for a transmitting-side neural network, wherein the input structure indicates one or more of non-zero values or locations for the non-zero values within an input, having the input size, to the transmitting-side neural network, as described above.

As further shown in FIG. 7, in some aspects, process 700 may include communicating with a base station based at least in part on the indication of the one or more of the input size or the input structure of the transmitting-side neural network (block 720). For example, the UE (e.g., using reception component 902 and/or transmission component 904, depicted in FIG. 9) may communicate with a base station based at least in part on the indication of the one or more of the input size or the input structure of the transmitting-side neural network, as described above.

Process 700 may include additional aspects, such as any single aspect or any combination of aspects described below and/or in connection with one or more other processes described elsewhere herein.

In a first aspect, the transmitting-side neural network is associated with uplink communications, or the transmitting-side neural network is associated with downlink communications.

In a second aspect, alone or in combination with the first aspect, receiving the indication of the one or more of the input size or the input structure comprises receiving the indication within a scheduling grant.

In a third aspect, alone or in combination with one or more of the first and second aspects, receiving the indication of the one or more of the input size or the input structure comprises receiving a definition of one or more parameters of the input size or the input structure.

In a fourth aspect, alone or in combination with one or more of the first through third aspects, the indication of the one or more of the input size or the input structure comprises an indication of one or more receiving-side neural networks associated with the transmitting-side neural network.

In a fifth aspect, alone or in combination with one or more of the first through fourth aspects, the one or more of the input size or the input structure are associated with one or more RE segments of a PRB, wherein one or more of an additional input size or an additional input structure are associated with one or more additional RE segments of the PRB, or a combination thereof.

In a sixth aspect, alone or in combination with one or more of the first through fifth aspects, the indication of the one or more of the input size or the input structure comprises an indication of the one or more of the additional input size or the additional input structure.

In a seventh aspect, alone or in combination with one or more of the first through sixth aspects, a transmitting device, of the UE or the base station, transmits a PRB, after applying the transmitting-side neural network, with normalized power over one or more RE segments of the PRB.

In an eighth aspect, alone or in combination with one or more of the first through fifth aspects, process 700 includes determining an uplink control channel format configuration based at least in part on the indication of the indication of the one or more of the input size or the input structure.

In a ninth aspect, alone or in combination with the eighth aspect, a first uplink control channel resource within a first uplink control channel resource set is associated with the one or more of the input size or the input structure, and wherein a second uplink control channel resource within the first uplink control channel resource set is associated with one or more of an additional input size or an additional input structure.

In a tenth aspect, alone or in combination with one or more of the first through fifth aspects, the eighth aspect, or the ninth aspect, receiving the indication of the one or more of the input size or the input structure comprises receiving the indication associated with an uplink control channel resource within a scheduling grant for a downlink shared channel transmission, wherein the communicating with the base station comprises transmitting hybrid automatic repeat request (HARQ) feedback using the uplink control channel resource via the transmitting-side neural network.

In an eleventh aspect, alone or in combination with one or more of the first through fifth aspects, communicating with the base station comprises receiving, from the base station via a downlink control channel, a transmission generated by the base station based at least in part on the transmitting-side neural network, wherein the one or more of the input size or the input structure are associated with one or more RE group bundles, one or more control channel elements, one or more aggregation levels, one or more search spaces, one or more control resource sets, or a combination thereof.

In a twelfth aspect, alone or in combination with one or more of the first through fifth aspects or the eleventh aspect, a first control resource set associated with the one or more of the input size or the input structure is associated with a first priority, wherein a second control resource set associated with one or more of an additional input size or an additional input structure is associated with a second priority, and wherein the UE is configured to prioritize monitoring of the first control resource set or the second control resource set based at least in part on one or more of the UE operating in a power saving mode, a number of blind decoding attempts satisfying a threshold, or a number of channel estimation attempts satisfying a threshold.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
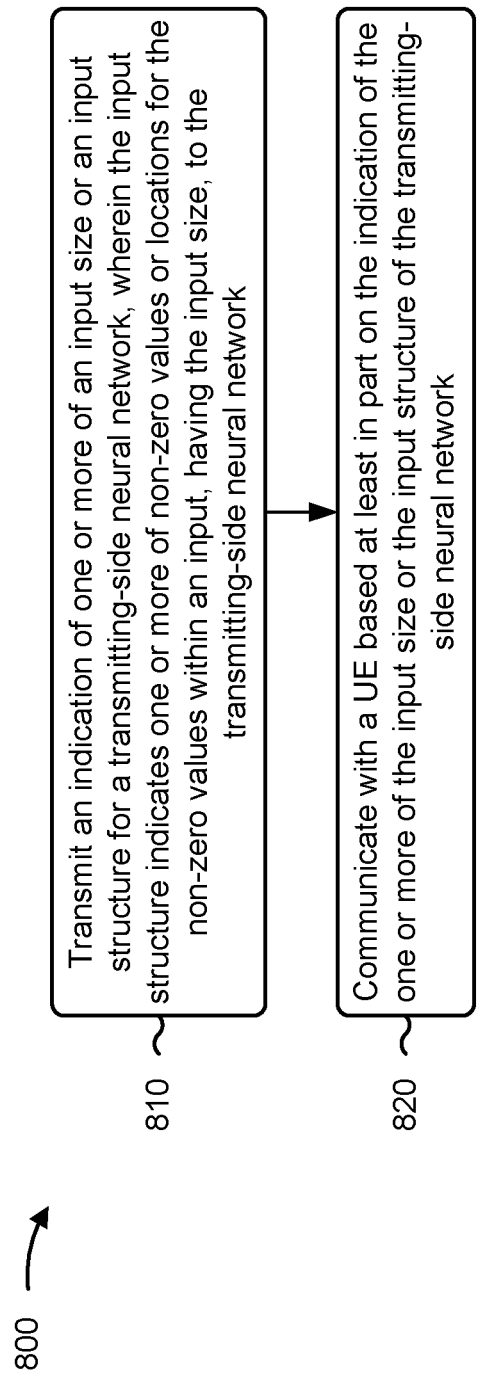

FIG. 8 is a diagram illustrating an example process 800 performed, for example, by a base station, in accordance with various aspects of the present disclosure. Example process 800 is an example where the base station (e.g., base station 110) performs operations associated with communications using a neural network based at least in part on an indicated input size and/or input structure.

As shown in FIG. 8, in some aspects, process 800 may include transmitting an indication of one or more of an input size or an input structure for a transmitting-side neural network, wherein the input structure indicates one or more of non-zero values or locations for the non-zero values within an input, having the input size, to the transmitting-side neural network (block 810). For example, the base station (e.g., using transmission component 1004, depicted in FIG. 10) may transmit an indication of one or more of an input size or an input structure for a transmitting-side neural network, wherein the input structure indicates one or more of non-zero values or locations for the non-zero values within an input, having the input size, to the transmitting-side neural network, as described above.

As further shown in FIG. 8, in some aspects, process 800 may include communicating with a UE based at least in part on the indication of the one or more of the input size or the input structure of the transmitting-side neural network (block 820). For example, the base station (e.g., using reception component 1002 and/or transmission component 1004, depicted in FIG. 10) may communicate with a UE based at least in part on the indication of the one or more of the input size or the input structure of the transmitting-side neural network, as described above.

Process 800 may include additional aspects, such as any single aspect or any combination of aspects described below and/or in connection with one or more other processes described elsewhere herein.

In a first aspect, transmitting the indication of the one or more of the input size or the input structure comprises transmitting the indication within a scheduling grant, or transmitting the indication within an uplink control channel format configuration.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
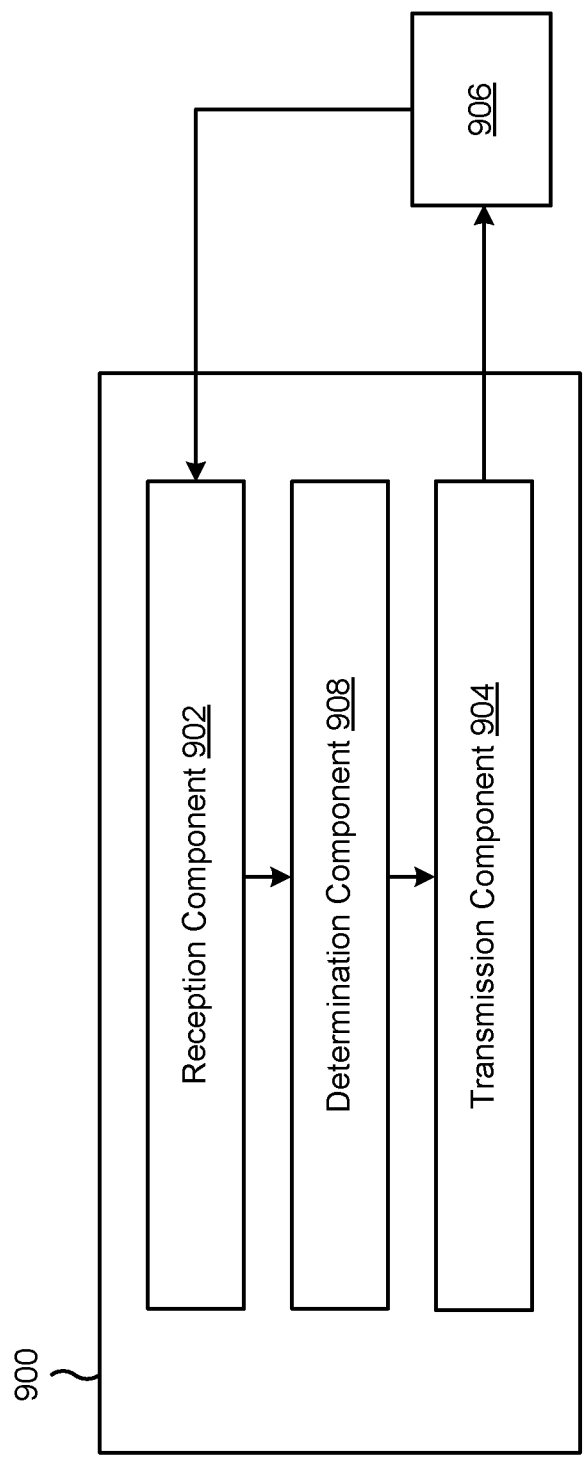
FIGS. 9 and 10 are block diagrams of example apparatuses for wireless communication, in accordance with various aspects of the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a determination component 908.

In some aspects, the apparatus 900 may be configured to perform one or more operations described herein in connection with FIGS. 4-6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The reception component 902 may receive an indication of one or more of an input size or an input structure for a transmitting-side neural network, wherein the input structure indicates one or more of non-zero values or locations for the non-zero values within an input, having the input size, to the transmitting-side neural network. The reception component 902 and/or the transmission component 904 may communicate with a base station based at least in part on the indication of the one or more of the input size or the input structure of the transmitting-side neural network.

The determination component 908 may determine an uplink control channel format configuration based at least in part on the indication of the indication of the one or more of the input size or the input structure.

The determination component 908 and/or the reception component 902 may decode a PRB based at least in part on a receiving-side neural network associated with a transmitting-side neural network used by a base station to transmit the PRB.

The determination component 908 and/or the transmission component 904 may encode a PRB based at least in part on a transmitting-side neural network with an input size and/or input structure as indicated by a base station.

The determination component 908 and/or the reception component 902 may decode DCI based at least in part on a receiving-side neural network associated with a transmitting-side neural network used by a base station to transmit the DCI.

The determination component 908 and/or the transmission component 904 may encode UCI based at least in part on a transmitting-side neural network with an input size and/or input structure as indicated by a base station.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
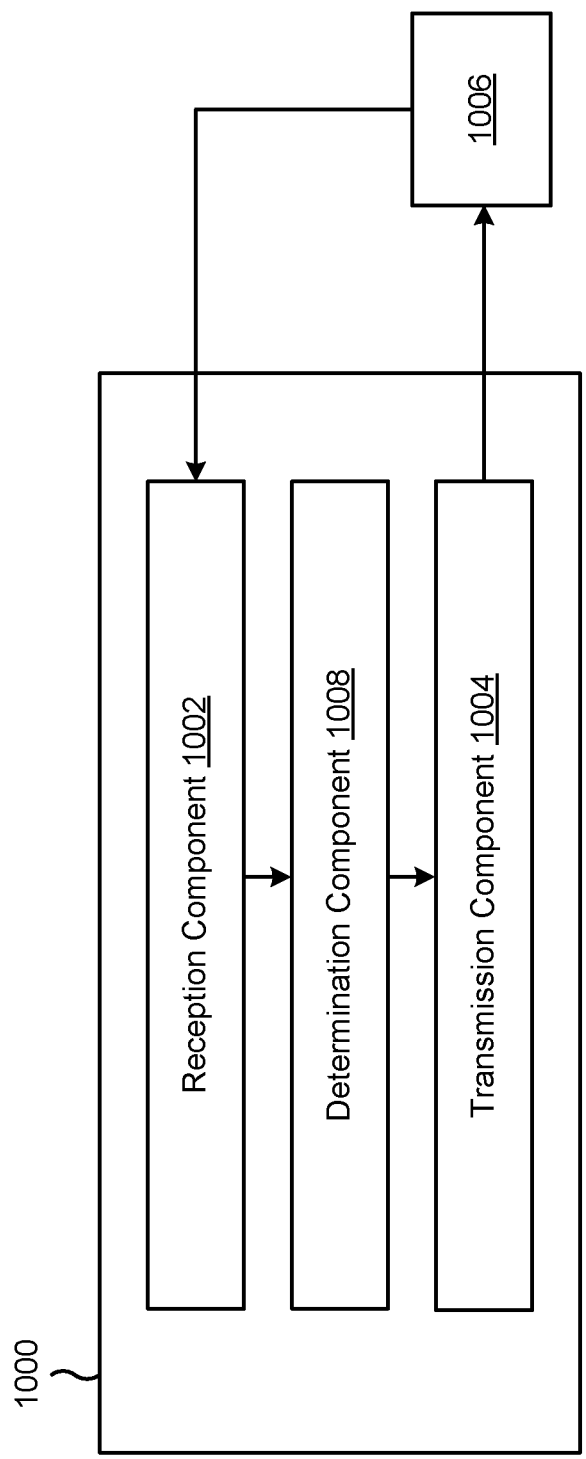

FIG. 10 is a block diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a determination component 1008.

In some aspects, the apparatus 1000 may be configured to perform one or more operations described herein in connection with FIGS. 4-6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the base station described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the base station described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the base station described above in connection with FIG. 2. In some aspects, the transmission component 1004 may be co-located with the reception component 1002 in a transceiver.

The transmission component 1004 may transmit an indication of one or more of an input size or an input structure for a transmitting-side neural network, wherein the input structure indicates one or more of non-zero values or locations for the non-zero values within an input, having the input size, to the transmitting-side neural network. The reception component 1002 and/or the transmission component 1004 may communicate with a UE based at least in part on the indication of the one or more of the input size or the input structure of the transmitting-side neural network.

The determination component 1008 and/or the reception component 1002 may decode a PRB based at least in part on a receiving-side neural network associated with a transmitting-side neural network used by a UE to transmit the PRB.

The determination component 1008 and/or the transmission component 1004 may encode a PRB based at least in part on a transmitting-side neural network with an input size and/or input structure as indicated to a UE.

The determination component 1008 and/or the reception component 1002 may decode a uplink control information based at least in part on a receiving-side neural network associated with a transmitting-side neural network used by a UE to transmit the uplink control information.

The determination component 1008 and/or the transmission component 1004 may encode downlink control information based at least in part on a transmitting-side neural network with an input size and/or input structure as indicated to a UE.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of aspects of the present disclosure:

Aspect 1: A method of wireless communication performed by a user equipment (UE), comprising: receiving an indication of one or more of an input size or an input structure for a transmitting-side neural network, wherein the input structure indicates one or more of non-zero values or locations for the non-zero values within an input, having the input size, to the transmitting-side neural network; and communicating with a base station based at least in part on the indication of the one or more of the input size or the input structure of the transmitting-side neural network.

Aspect 2: The method of aspect 1, wherein the transmitting-side neural network is associated with uplink communications, or wherein the transmitting-side neural network is associated with downlink communications.

Aspect 3: The method of any of aspects 1 through 2, wherein receiving the indication of the one or more of the input size or the input structure comprises: receiving the indication within a scheduling grant.

Aspect 4: The method of any of aspects 1 through 3, wherein receiving the indication of the one or more of the input size or the input structure comprises: receiving a definition of one or more parameters of the input size or the input structure.

Aspect 5: The method of any of aspects 1 through 4, wherein the indication of the one or more of the input size or the input structure comprises: an indication of one or more receiving-side neural networks associated with the transmitting-side neural network.

Aspect 6: The method of any of aspects 1 through 5, wherein the one or more of the input size or the input structure are associated with one or more resource element segments of a physical resource block, wherein one or more of an additional input size or an additional input structure are associated with one or more additional resource element segments of the physical resource block, or a combination thereof.

Aspect 7: The method of any of aspects 1 through 6, wherein the indication of the one or more of the input size or the input structure comprises: an indication of the one or more of the additional input size or the additional input structure.

Aspect 8: The method of any of aspects 1 through 7, wherein a transmitting device, of the UE or the base station, transmits a physical resource block, after applying the transmitting-side neural network, with normalized power over one or more resource element segments of the physical resource block.

Aspect 9: The method of any of aspects 1 through 6, further comprising: determining an uplink control channel format configuration based at least in part on the indication of the indication of the one or more of the input size or the input structure.

Aspect 10: The method of aspect 9, wherein a first uplink control channel resource within a first uplink control channel resource set is associated with the one or more of the input size or the input structure, and wherein a second uplink control channel resource within the first uplink control channel resource set is associated with one or more of an additional input size or an additional input structure.

Aspect 11: The method of any of aspects 1 through 6, 8, or 9, wherein receiving the indication of the one or more of the input size or the input structure comprises: receiving the indication associated with an uplink control channel resource within a scheduling grant for a downlink shared channel transmission, wherein the communicating with the base station comprises transmitting hybrid automatic repeat request feedback using the uplink control channel resource via the transmitting-side neural network.

Aspect 12: The method of any of aspects 1 through 6, wherein communicating with the base station comprises: receiving, from the base station via a downlink control channel, a transmission generated by the base station based at least in part on the transmitting-side neural network, wherein the one or more of the input size or the input structure are associated with: one or more resource element group bundles, one or more control channel elements, one or more aggregation levels, one or more search spaces, one or more control resource sets, or a combination thereof.

Aspect 13: The method of any of aspects 1 through 6 or 12, wherein a first control resource set associated with the one or more of the input size or the input structure is associated with a first priority, wherein a second control resource set associated with one or more of an additional input size or an additional input structure is associated with a second priority, and wherein the UE is configured to prioritize monitoring of the first control resource set or the second control resource set based at least in part on one or more of: the UE operating in a power saving mode, a number of blind decoding attempts satisfying a threshold, or a number of channel estimation attempts satisfying a threshold.

Aspect 14: A method of wireless communication performed by a base station, comprising: transmitting an indication of one or more of an input size or an input structure for a transmitting-side neural network, wherein the input structure indicates one or more of non-zero values or locations for the non-zero values within an input, having the input size, to the transmitting-side neural network; and communicating with a user equipment (UE) based at least in part on the indication of the one or more of the input size or the input structure of the transmitting-side neural network.

Aspect 15: The method of aspect 14, wherein transmitting the indication of the one or more of the input size or the input structure comprises: transmitting the indication within a scheduling grant, or transmitting the indication within an uplink control channel format configuration.

Aspect 16: The method of aspect 15, wherein the one or more processors, when transmitting the indication of the one or more of the input size or the input structure, are configured to: transmit the indication within a scheduling grant, or transmit the indication within an uplink control channel format configuration.

Aspect 17: An apparatus for wireless communication at a device, comprising a processor; memory coupled with the processor; and instructions stored in the memory and executable by the processor to cause the apparatus to perform the method of one or more aspects of aspects 1-16.

Aspect 18: A device for wireless communication, comprising a memory and one or more processors coupled to the memory, the memory and the one or more processors configured to perform the method of one or more aspects of aspects 1-16.

Aspect 19: An apparatus for wireless communication, comprising at least one means for performing the method of one or more aspects of aspects 1-16.

Aspect 20: A non-transitory computer-readable medium storing code for wireless communication, the code comprising instructions executable by a processor to perform the method of one or more aspects of aspects 1-16.

Aspect 33: A non-transitory computer-readable medium storing a set of instructions for wireless communication, the set of instructions comprising one or more instructions that, when executed by one or more processors of a device, cause the device to perform the method of one or more aspects of aspects 1-16.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), the method comprising:
   receiving an indication of an input structure, for an input to a transmitting-side neural network, wherein the input structure indicates one or more of non-zero values within the input or locations for the non-zero values within the input;
   determining an uplink channel format configuration based at least in part on the indication of the input structure; and
   communicating with a network entity based at least in part on the indication of the input structure.

2. The method of claim 1, wherein the transmitting-side neural network is associated with uplink communications, or wherein the transmitting-side neural network is associated with downlink communications.

3. The method of claim 1, wherein receiving the indication of the input structure comprises:
   receiving the indication within a scheduling grant.

4. The method of claim 1, wherein receiving the indication of the input structure comprises:
   receiving a definition of one or more parameters of the input structure.

5. The method of claim 1, wherein the indication of the input structure comprises:

an indication of one or more receiving-side neural networks associated with the transmitting-side neural network.

6. The method of claim 1, wherein the input structure is associated with one or more resource element segments of a physical resource block, an additional input structure is associated with one or more additional resource element segments of the physical resource block, or a combination thereof.

7. The method of claim 6, wherein the indication of the input structure comprises:
an indication of the additional input structure.

8. The method of claim 1, wherein a transmitting device, of the UE or the network entity, transmits a physical resource block, after applying the transmitting-side neural network, with normalized power over one or more resource element segments of the physical resource block.

9. The method of claim 1, wherein a first uplink control channel resource within a first uplink control channel resource set is associated with the input structure, and wherein a second uplink control channel resource within the first uplink control channel resource set is associated with an additional input structure.

10. The method of claim 1, wherein receiving the indication of the input structure comprises:
receiving the indication, the indication associated with an uplink control channel resource within a scheduling grant for a downlink shared channel transmission, wherein the communicating with the network entity comprises transmitting hybrid automatic repeat request feedback using the uplink control channel resource via the transmitting-side neural network.

11. The method of claim 1, wherein communicating with the network entity comprises:
receiving, from the network entity via a downlink control channel, a transmission generated by the network entity based at least in part on the transmitting-side neural network, wherein the input structure is associated with:
one or more resource element group bundles,
one or more control channel elements,
one or more aggregation levels,
one or more search spaces,
one or more control resource sets,
or a combination thereof.

12. The method of claim 11, wherein a first control resource set associated with the input structure is associated with a first priority, wherein a second control resource set associated with an additional input structure is associated with a second priority, and wherein the UE is configured to prioritize monitoring of the first control resource set or the second control resource set based at least in part on one or more of:
the UE operating in a power saving mode,
a number of blind decoding attempts satisfying a threshold, or
a number of channel estimation attempts satisfying another threshold.

13. A user equipment (UE) for wireless communication, the UE comprising:
one or more memories; and
one or more processors coupled to the one or more memories, the one or more memories storing instructions configurable to be executed by the one or more processors to cause the UE to:
receive an indication of an input structure, for an input to a transmitting-side neural network, wherein the input structure indicates one or more of non-zero values within the input or locations for the non-zero values within the input;
determine an uplink channel format configuration based at least in part on the indication of the input structure; and
communicate with a network entity based at least in part on the indication of the input structure.

14. The UE of claim 13, wherein the transmitting-side neural network is associated with uplink communications, or wherein the transmitting-side neural network is associated with downlink communications.

15. The UE of claim 13, wherein the instructions are further executable by the one or more processors, when receiving the indication of the input structure, to cause the UE to:
receive the indication within a scheduling grant.

16. The UE of claim 13, wherein the instructions are further executable by the one or more processors, when receiving the indication of the input structure, to cause the UE to:
receive a definition of one or more parameters of the input structure.

17. The UE of claim 13, wherein the indication of the input structure comprises:
an indication of one or more receiving-side neural networks associated with the transmitting-side neural network.

18. The UE of claim 13, wherein the input structure is associated with one or more resource element segments of a physical resource block, an additional input structure is associated with one or more additional resource element segments of the physical resource block, or a combination thereof.

19. The UE of claim 18, wherein the indication of the input structure comprises:
an indication of the additional input structure.

20. The UE of claim 13, wherein a transmitting device, of the UE or the network entity, transmits a physical resource block, after applying the transmitting-side neural network, with normalized power over one or more resource element segments of the physical resource block.

21. The UE of claim 13, wherein a first uplink control channel resource within a first uplink control channel resource set is associated with the input structure, and wherein a second uplink control channel resource within the first uplink control channel resource set is associated with an additional input structure.

22. The UE of claim 13, wherein the instructions are further executable by the one or more processors, when receiving the indication of the input structure, to cause the UE to:
receive the indication, the indication associated with an uplink control channel resource within a scheduling grant for a downlink shared channel transmission, wherein the communicating with the network entity comprises transmitting hybrid automatic repeat request feedback using the uplink control channel resource via the transmitting-side neural network.

23. The UE of claim 13, wherein the instructions are further executable by the one or more processors, when communicating with the network entity, to cause the UE to:
receive, from the network entity via a downlink control channel, a transmission generated by the network entity based at least in part on the transmitting-side neural network, wherein the input structure is associated with:
one or more resource element group bundles, one or more control channel elements,
one or more aggregation levels,
one or more search spaces,
one or more control resource sets,
or a combination thereof.

24. The UE of claim 23, wherein a first control resource set associated with the input structure is associated with a first priority, wherein a second control resource set associated with an additional input structure is associated with a second priority, and wherein the UE is configured to prioritize monitoring of the first control resource set or the second control resource set based at least in part on one or more of:
the UE operating in a power saving mode,
a number of blind decoding attempts satisfying a threshold, or
a number of channel estimation attempts satisfying an other threshold.

25. A method of wireless communication performed by a network entity, the method comprising:
transmitting an indication of an input structure, for an input to a transmitting-side neural network, wherein the input structure indicates one or more of non-zero values within the input or locations for the non-zero values within the input; and
communicating with a user equipment (UE) based at least in part on the indication of the input structure, wherein an uplink channel format configuration is based at least in part on the indication of the input structure.

26. The method of claim 25, wherein transmitting the indication of the input structure comprises:
transmitting the indication within a scheduling grant, or
transmitting the indication within the uplink channel format configuration.

27. The method of claim 25, wherein the transmitting-side neural network is associated with uplink communications, or wherein the transmitting-side neural network is associated with downlink communications.

28. A network entity for wireless communication, the network entity comprising:
one or more memories; and
one or more processors coupled to the one or more memories, the one or more memories storing instructions configurable to be executed by the one or more processors to cause the network entity to:
transmit an indication of an input structure, for an input to a transmitting-side neural network, wherein the input structure indicates one or more of non-zero values within the input or locations for the non-zero values within the input; and
communicate with a user equipment (UE) based at least in part on the indication of the input structure, wherein an uplink channel format configuration is based at least in part on the indication of the input structure.

29. The network entity of claim 28, wherein the instructions are further executable by the one or more processors, when transmitting the indication of the input structure, to cause the network entity to:
transmit the indication within a scheduling grant, or
transmit the indication within the uplink channel format configuration.

30. The network entity of claim 28, wherein the transmitting-side neural network is associated with uplink communications, or wherein the transmitting-side neural network is associated with downlink communications.

* * * * *